United States Patent [19]
Hirsbrunner et al.

[11] 3,818,470
[45] June 18, 1974

[54] FLUID LEVEL DETECTOR

[75] Inventors: Hans G. Hirsbrunner, Attleboro; Joseph W. Waseleski, Jr., Mansfield, both of Mass.

[73] Assignee: Texas Instruments Incorporated, Dallas, Tex.

[22] Filed: Jan. 10, 1973

[21] Appl. No.: 322,579

Related U.S. Application Data

[63] Continuation of Ser. No. 93,212, Nov. 27, 1970, abandoned.

[52] U.S. Cl. ............... 340/244 R, 350/267, 340/59
[51] Int. Cl. ........................................... G08b 21/00
[58] Field of Search .......................... 340/244 R, 59

[56] References Cited
UNITED STATES PATENTS

| | | | |
|---|---|---|---|
| 2,976,763 | 3/1961 | McKeag | 340/244 R |
| 3,263,553 | 8/1966 | Baruch | 340/244 R |
| 3,384,885 | 5/1968 | Forbush | 340/244 R |
| 3,553,666 | 1/1971 | Melone | 340/244 R |

*Primary Examiner*—Thomas B. Habecker
*Attorney, Agent, or Firm*—John A. Haug; James P. McAndrews; Edward J. Connors, Jr.

[57] ABSTRACT

A detector is disclosed for indicating the presence or absence of a predetermined medium and includes an energy emitting means, an energy refracting means, and an energy sensing means which is in selective communication with the energy emitting means through an energy transmitting medium, which selectively couples the energy sensing means to the energy emitting means along a predetermined path only when the energy refracting means is in communication with the medium. The energy refracting means includes an energy transmitting body portion bounded in part by at least two non-parallel surface portions in the path of the emitted energy, one of the surface portions defining an external interface adapted to communicate with the medium to effect transmission of energy through the interface, when the interface is in communication with the medium, and to reflect energy from the interface along a portion of the predetermined path, through the energy transmitting medium, and to the energy sensing means, when the interface is not in communication with the medium so as to provide an indication of the presence or absence of the medium.

7 Claims, 6 Drawing Figures

PATENTED JUN 18 1974 3,818,470

INVENTOR.
Hans G. Hirsbrunner
BY Joseph W. Waseleski Jr.

Gerald B. Epstein Atty.

3,818,470

FLUID LEVEL DETECTOR

This is a continuation of application Ser. No. 93,212, filed Nov. 27, 1970 now abandoned.

Various types of liquid level detector devices are presently available for sensing the presence or absence of a liquid or for sensing the presence or absence of such a liquid at a preselected depth within a container. Such devices generally are either mechanically or electrically operated and in certain instances may be subject to operational deficiencies. The mechanical type of device generally utilizes a suitable float or other such arrangement for mechanically sensing the presence of liquid at a predetermined depth and is, of course, subject to the attendant problems of mechanical devices, i.e., eventual wear of moving parts, necessity for lubrication or other such periodic maintenance, etc. Electrical devices of this type generally utilize an electrical sensor which may be disposed in a position adapted to contact the liquid being sensed, and the change in an electrical property of the sensor may be sensed as an indication of the presence of the liquid. However, such an arrangement necessarily requires dependence upon continued satisfactory electrical operation of the sensor device. In addition, electronic devices when exposed to adverse environments, such as moisture, are subject to eventual degradation and inoperability.

Accordingly, it is an object of the present invention to provide an improved fluid detector adapted to sense the presence or absence of a predetermined medium.

It is another object of the present invention to provide an improved liquid level detector adapted to sense the presence or absence of a preselected liquid at a predetermined level.

It is a further object of the present invention to provide an improved liquid level detector which is extremely durable in use and economical to fabricate.

Various additional objects and advantages of the present invention will become readily apparent from the following detailed description and accompanying drawings wherein.

Figure 5:
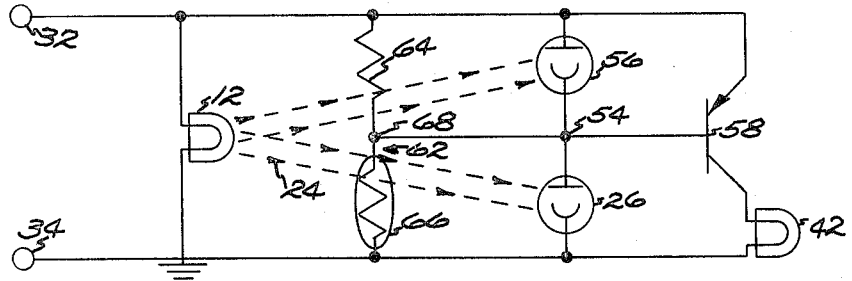
Figure 6:
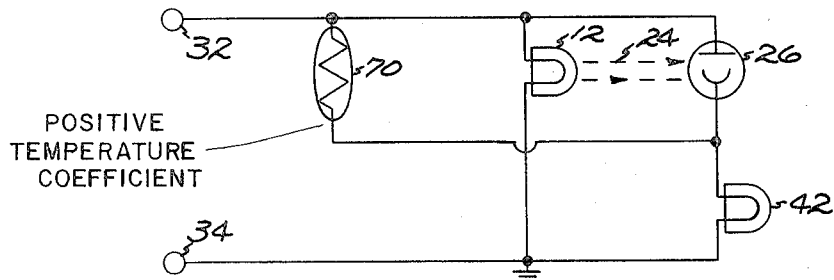

FIG. 5 is an electrical schematic circuit diagram of another alternative embodiment of an electrical network adapted to be incorporated in a liquid level detector in accordance with the present invention; and FIG. 6 is an electrical schematic circuit diagram of a further alternative embodiment of an electrical circuit adapted to be incorporated in a liquid level detector in accordance with the present invention.

Figure 1:
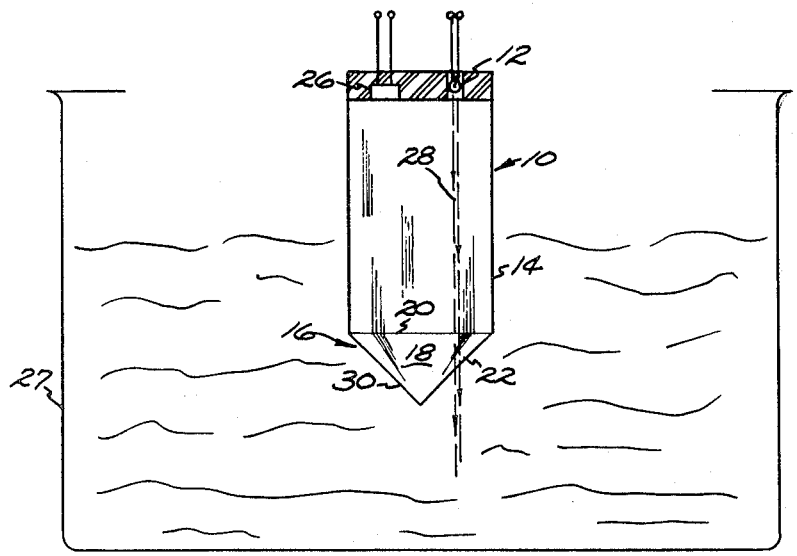
FIG. 1 is a vertical sectional view of a typical liquid level detector in accordance with the present invention in communication with a liquid medium.
Figure 2:
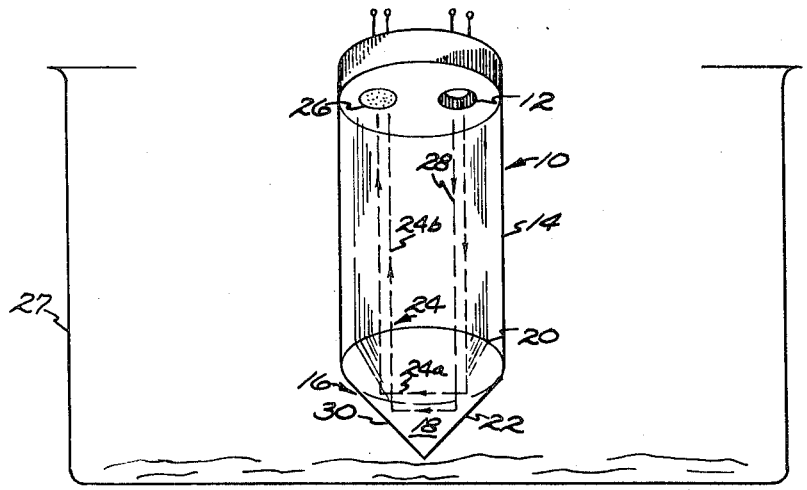
FIG. 2 is a perspective view of the device of FIG. 1 but illustrating the detector in a position in which it is not in contact with the liquid.

Referring generally to the drawings and in particular initially to FIGS. 1 and 2, a detector indicated generally by the reference numeral 10 is illustrated and includes an energy emitting means 12, an energy transmitting medium 14 in communication with the energy emitting means, and an energy refracting means 16 which is in communication with the energy emitting means through the energy transmitting medium. The energy refracting means 16 includes an energy transmitting body portion 18 bounded at least in part by two nonparallel surface portions 20, 22 with one of the surface portions 22 defining an external interface adapted to communicate with the medium when the medium is present. More particularly, in accordance with the present invention, energy is transmitted through the interface 22, when the medium is in communication with the interface, while energy is reflected from the interface through the energy transmitting medium 14 along a predetermined path 24 including a first portion 24a and a second portion, 24b when the interface is not in communication with the medium. In addition, an energy sensing means 26 is provided disposed in communication with the predetermined path 24 for sensing the presence of reflected energy in order to provide an indication of the presence of the medium.

Although the detector 10 is illustrated in a vertical position depending within an enclosure or casing 27, the detector may be arranged in various orientations and utilized for detecting the presence or absence of various fluid media. In accordance with a preferred embodiment of the present invention, it has been found to be quite advantageous to utilize optical radiation energy for detecting the presence or absence of a medium. Accordingly, the energy emitting device 12 preferably comprises a suitable emitter of optical radiation such as a miniature light source adapted to emit optical radiation of a desired wave length along a light path 28, while this light is reflected from the external interface 22 along the predetermined path 24, when the medium is not in contact with the interface. In addition, if desired, a suitable lens may be coupled to the light emitter for focusing the emitted light. The energy transmitting body 14 preferably comprises a light transmitting body, such as a solid light transparent body fabricated of various types of glasses and plastics, such as crown glass, flint glass, plexiglass, etc., which efficiently transmit optical radiation, while the energy refracting body 18 preferably comprises a light refracting prismatic body which may be formed of a material similar to the light transmitting body and, as shown, is arranged at an end of the light transmitting body opposite to that at which the light emitter 12 is disposed. Similarly, the energy sensing means 26 preferably comprises a device which is sensitive to optical radiation and has a property which varies in response to the incidence of light thereon so as to provide an indication of the presence or absence of incident light. In this regard, the optical sensing device 26 preferably comprises a suitable photoelectric cell which is maintained optically isolated from the light emitter 12 but is in optical communication with the predetermined path 24, and has an electrical resistance which varies in response to the incidence of light thereon. A conventional photoelectric cell, as contemplated for use in a preferred embodiment of the present invention generally has a relatively high resistance in the absence of incident light and a relatively low resistance in response to the incidence of light thereon and accordingly may be arranged in an appropriate electrical circuit for sensing its resistance mode and hence providing an indication of the presence or absence of the medium in contact with the detector, as will be explained in detail hereinafter. In this regard, as illustrated, the light emitter and the light sensor are preferably arranged at a common end of the detector so as to simplify its design and fabrication, as well as simplifying the formation of electrical connections thereto, and simplifying the packaging of the light emitter and light sensor in a single package in common with the associated electrical circuitry utilizing conventional and readily available circuit packages, if desired.

The energy refracting body 18 preferably comprises a light refracting or prismatic body formed of a light transparent material, as previously mentioned, having light transmission characteristics essentially identical to the light transmitting medium 14. The prismatic body 18 has a predetermined geometric shape and is arranged such that at least two of its surface portions in the path of the emitted light originating from the light emitter 12 are non-parallel with respect to each other, while the surface portion 22 defines an external interface adapted to communicate with the medium. More particularly, the prismatic body 18 may be integrally formed with the light transmitting medium 14 such as by the use of suitable molding procedures, or alternatively may be separately formed and suitably secured to the light transmitting medium 14. In addition, the prismatic body 18, as previously mentioned, is arranged such that at least a portion of the light energy which passes through the two surface portions 20, 22 is internally reflected along the predetermined path 24, when the external interface 22 is in communication or contact with the medium being sensed. In this regard, the detector 10 in accordance with the present invention, is particularly adapted for detecting the presence or absence at a preselected level of a liquid medium, such as water, or other liquid media having an index of refraction which differs from air so that the emitted light is internally reflected, when the fluid is not at a sufficient level to contact the interface 22. The prismatic body 18 may be fabricated in a variety of geometric shapes, such as a transparent body having a pair of generally planar, rectangular-shaped, nonparallel surfaces which meet at a common straight edge at one end and are joined by a rectangular-shaped base at their opposite ends defining a conventional triangular-shaped prism. Similarly, other shapes of prismatic bodies may be suitable for use in certain instances. However, in accordance with an important feature of the present invention and as shown in FIGS. 1 and 2, the prismatic body 18 is preferably formed in a generally conical configuration having its base defined by the portion 20, also defining an end of body 14, an elongated generally cylindrical body as seen in FIGS. 1 and 2, and having a surface of revolution which includes the external interface 22, as well as including an opposed surface portion 30 on the surface of revolution which is in generally aligned facing relationship with the interface 22 and defines another external interface, as shown. Such a configuration is particularly advantageous in that it removes any necessity for a critical revolutionary alignment of the light emitter 12 and the light sensor 26 as would be necessary if a triangular-shaped prism, for example, were utilized. In the conical configuration illustrated, it is preferred that the included angle defined by the vertex of the conical shape be between approximately 60° to 90° and in a preferred embodiment is approximately 90° in order to obtain the requisite internal light reflection when the interfaces 22, 30 are not in contact with the medium, the presence of which is being sensed. In addition, it may be noted that in order to provide the requisite optical isolation between the light emitter 12 and the light sensor 26, it may be desirable in certain instances to dispose a suitable baffle intermediate the light emitter 12 and the light sensor 26 to prevent any optical coupling therebetween except along the predetermined path 24. However, in order to alleviate the need for such a provision, as shown in FIGS. 1 and 2, the light emitter 12 is slightly recessed from the edge of the one end of the ight transmitting body 14 which precludes any undesired light leakage to the light sensor 26.

A brief description will now be provided of the operation of the detector 10 and subsequently of several electrical circuits (FIGS. 3–6) which are particularly suitable for incorporation within the detector for energizing the light emitter 12 and for sensing the operation of the light sensor 26 as an indication of the presence or absence of a liquid at a predetermined level and providing a visual or other indication thereof. Referring now initially to FIG. 1, it may be seen that the detector 10 is oriented such that the vertex of the prismatic body 18 is oriented in a direction facing the liquid, the presence of which is being detected. In the FIG. 1 illustration, the liquid is at a level such that it is in contact with the external interfaces 22, 30 of the prismatic body 18. Thus, as light is emitted from the light emitter 12, it is transmitted along the path 28 passing through the surfaces 20, 22 of the prismatic body 18 and through the liquid which is in contact with the external interface 22. It may be seen that the light is not refracted in view of the presence of the liquid in contact with the external interface 22, since there is no significant difference between the velocity of light through the prismatic body 18 and through the liquid, and hence no internal reflection of light occurs. As a result, no reflected light is incident upon the light sensor 26 which remains unenergized and in its high resistance mode. Such nonoperation or nonenergization of the light sensor 26 may conveniently serve as an indication of the presence of liquid at a preselected level. Referring now to FIG. 2, the detector 10 is illustrated in a position in which the level of liquid has dropped to a level at which it is no longer in contact with the external interfaces 22, 30. Consequently, as light is emitted from the light emitter 12 and impinges upon the interface 22, the light is not transmitted through the interface due to the angle at the vertex of the conically-shaped prismatic body 18. Instead, the light is internally reflected along a portion 24a of the predetermined path 24, as shown. In this regard, the angle of the vertex of the conically shaped prismatic body 16 is selected such that light which is transmitted generally normal to the plane of the base of the conically-shaped prismatic body 18 is reflected from the interface along a path, i.e., the path 24a which is generally normal to the original path 28 of the emitted light, as shown. If desired, the light sensor 26 could be arranged in optical communication with the portion 24a of the predetermined path 24, but in a preferred embodiment of the present invention in order to facilitate fabrication of the detector, the light sensor is arranged at the same end of the light transmitting body portion 14 as the light emitter. Accordingly, the conically-shaped body 18 is arranged such that the light which is reflected along the portion 24a of the predetermined path 24 impinges upon the external interface 30, which, as previously explained, is in generally aligned facing relationship with the portion 22 of the surface of revolution of the conically-shaped body 18. This reflected incident light is, in turn, reflected along another portion 24b of the predetermined path 24 in a direction generally normal to the portion 24a as shown, in view of the absence of liquid in contact with the interface 30. In this regard, it may be seen that the light sensor 26 is arranged in optical communication with this portion 24b of the predetermined path and hence the light impinges upon the light sensor which is thereby energized, as will be more particularly explained in detail hereinafter, so as to provide an indication of the absence of liquid at the predetermined level. Accordingly, it may be seen that the liquid level detector 10 utilizes optical coupling principles for providing an indication of the presence or absence of liquid at a predetermined level within a container. In addition, it may be further readily seen that by virtue of the construction of the detector 10, the light sensor 26 and the light emitter 12 are arranged such that they are substantially spaced from the liquid, the level of which is being detected and hence are not exposed to a potentially harmful environment. Furthermore, if desired, the detector may be encased in a suitable hermetically sealed container in which only the external electrical leads necessary for energizing the light emitter 12 and for providing an indication of operation of the light sensor 26 extend outwardly from the casing. Furthermore, the associated electrical circuitry employed for energizing the detector may also be encased within the hermetic enclosure as well as a miniature battery operated power supply, if desired.

Figure 3:
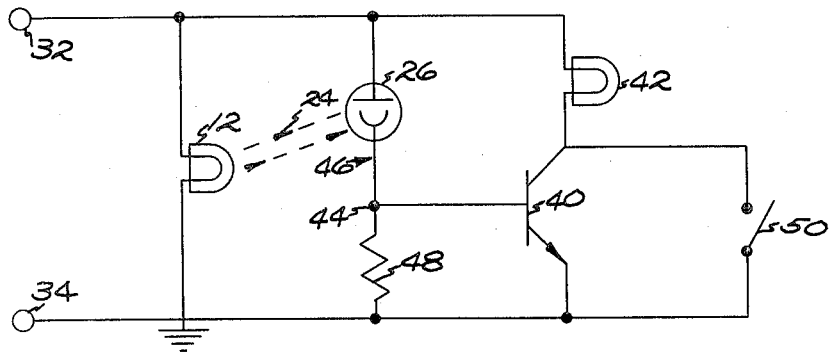
FIG. 3 is a schematic circuit diagram of an electrical circuit adapted to be incorporated in a liquid level detector in accordance with the present invention.

Referring now to FIG. 3, a typical embodiment of an electrical circuit is illustrated, which is adapted for incorporation within the detector 10. As shown, the circuit includes the light emitter 12 and the light sensor 26 which are in selective optical communication through the predetermined path 24 only when the interfaces 22, 30 are in contact with the liquid, the level of which is being detected. More particularly, as previously explained, the light sensor 26 preferably comprises a photoelectric cell having an electrical property which varies in response to the incidence or nonincidence of light thereon. In this connection, the photoelectric cell generally has a relatively high resistance in the absence of incident light thereon and has a relatively low resistance in response to the incidence of light thereon. However, in this connection, various other photosensitive devices could be utilized in place of the photoelectric cell, if desired, such as a phototransistor, a light sensitive diode, etc. Since, as previously explained, the light emitter is selectively coupled to the photoelectric cell 26 along the predetermined path 24 only when the prismatic body 18 is not in contact with the liquid being detected, in the absence of the liquid at a preselected level, the photoelectric cell 26 is energized as a result of the reflected light incident thereon and is in a low resistance mode, while in response to the presence of the liquid at a preselected level in contact with the prismatic body 18, the sensor 26 does not receive incident light emitted by the emitter 12 and hence remains in its high resistance mode. Accordingly, by sensing the change in resistance of the photoelectric cell 26, a convenient means is provided for detecting the presence or absence of the liquid at a preselected level. In the embodiment illustrated in FIG. 3, the circuit may be energized by a suitable low voltage power supply, not shown, through a pair of power supply terminals 32, 34. The photoelectric cell 26 is coupled to a selectively energizable switch means 40 which is arranged to remain in a nonconductive state, when the photoelectric cell 26 is in its high resistance mode, and is in a conductive state, when the photoelectric cell 26 is in its low resistance mode, as the result of light incident thereon. In addition, the selectively energizable switch means 40 may be serially coupled to an indicator light 42 which provides a visual indication of the operation of the photoelectric cell, in response to conduction of the switch means 40. In this regard, other types of indicators may be utilized, such as buzzers, flashers, etc., if desired. Thus, when the indicator light 42 lights as a result of conduction of the switch means 40 in response to the photoelectric cell being in its low resistance mode, a visual indication is provided that the liquid level has receded to a preselected depth below that at which the prismatic body 18 is located hence indicating that the liquid level has dropped below a predetermined level. In addition, if desired, a suitable load such as a relay, a valve, etc., may be coupled to the switch means 40 and arranged to be energized in response to conduction thereof so as to cause additional liquid to be automatically provided to raise the level or alternatively to effect operation of other associated equipment, such as a pump, or the like, when the liquid level drops below a preselected depth. In the embodiment illustrated in FIG. 3, the selectively energizable switch means 40 preferably comprises a semiconductor switch device, such as a transistor, and in the illustrated embodiment, comprises an NPN transistor having its base coupled to a junction 44 of a voltage divider configuration 46, one leg of which is defined by the photoelectric cell 26 and the other leg of which is defined by a resistor 48. Thus, in operation, since the base of the transistor 40 is coupled to the voltage divider junction 44, conduction of the transistor and consequently lighting of the indicator light 42 is dependent upon the voltage level established at the junction 44, which, in turn, is controlled by the variable resistance level of the photoelectric cell 26. In this connection, when the photoelectric cell 26 is in its high resistance mode in the absence of incident light thereon, the relative resistance value of the photoelectric cell 26 is high in comparison with the resistance of resistor 48 and hence the voltage level established at junction 44 is insufficient to render the transistor 40 conductive, which precludes lighting of the indicator light 42. However, when reflected light impinges upon the photoelectric cell 26, to cause it to operate in its low resistance mode, the relative resistance of resistor 48 is greater than that of the photoelectric cell 26 and hence a sufficient voltage level is established at junction 44 to energize the transistor 40 effecting energization of the indicator light 42 and hence providing an indication that the liquid level has fallen to a depth at which it is no longer in contact with the external interfaces 22, 30, of the prismatic body 16. In addition, if desired, in order to provide a check on operation of the indicator light 42, a normally open switch 50 may be connected in shunt across the collector-emitter circuit of the transistor and connected to the indicator light 42, as shown, such that closure of the switch 50 couples the indicator light to the power supply terminals and effects lighting of the indicator light 42 while the switch is temporarily closed as a test to provide an indication of proper operation of the indicator light.

Figure 4:
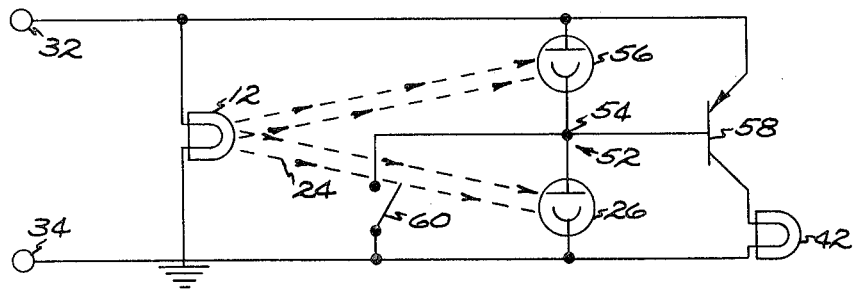
FIG. 4 is an electrical schematic circuit diagram of an alternative embodiment of an electrical circuit adapted to be incorporated in a liquid level detector in accordance with the present invention.

Referring now to FIG. 4, an alternative embodiment of an electrical circuit similar to that illustrated in FIG. 3, is shown, which may be incorporated as a part of the detector in accordance with the present invention. The FIG. 4 embodiment similarly include the light emitter 12 selectively optically coupled to the photoelectric cell 26 by the predetermined light path 24 and similarly includes the light indicator 42 electrically coupled to the photoelectric cell such that the photoelectric cell permits energizing current to flow through the indicator light, when the photoelectric cell is in its low resistance mode, while preventing energizing current from being supplied to the indicator light, when the photoelectric cell is in its high resistance mode. In this regard, the photoelectric cell 26 similarly comprises one leg of a voltage divider 52 having a voltage divider junction 54 while the other leg of the voltage divider 52 preferably comprises another photoelectric cell 56 which has a similar resistance level, when in its low resistance mode to the photoelectric cell 26. In addition, as shown, the photoelectric cell 56 is optically coupled to the light emitter 12 such that it is maintained in an energized state, i.e., a low resistance mode whenever the emitter 12 is in an energized state and is emitting light, while the photoelectric cell 26 is only maintained energized and in its low resistance mode, when it is optically coupled to the ight emitter along the predetermined path 24 in response to a lowering of the liquid level to a level below that at which the prismatic body 18 is positioned. In addition, a suitable switch means 58 preferably comprising a semiconductor switch means, such as a transistor, which in the illustrated embodiment, comprises a PNP transistor, is serially connected to the light indicator 42 so as to supply energizing current to the light indicator 42, when the transistor 58 is in a conductive state and to prevent the supply of energizing current thereto, when the transistor 58 is in a non-conductive state. In this regard, conduction of the transistor 58 is controlled by coupling its base to the voltage divider junction 54, as shown, so as to sense the voltage level established at the junction as a result of variations in the resistance level of the photoelectric cell 26, in a manner analogous to the FIG. 3 embodiment. Thus, when the light emitter 12 is energized and emits light, photoelectric cell 56 switches into its low resistance mode, but if the liquid level is at a sufficiently high level to contact the interfaces 22, 30 of the prismatic body 18 so that emitted light does not impinge upon the photoelectric cell 26, the relative resistance of the photoelectric cell 26 remains substantially higher than that of the photoelectric cell 56 and the voltage level established at the junction 54 maintains the transistor 58 in a non-conductive condition. However, as the liquid level drops to a point below the prismatic body 18 and light impinges upon the photoelectric cell 26 causing its resistance to drop to a value approximating that of the photoelectric cell 56, the voltage level established at the junction 54 renders the transistor 58 conductive and the indicator light 42 is lit as an indication of the fluctuation in liquid level. In addition, a normally open switch 60 is connected across the photoelectric cell 26, as shown, and is arranged to shunt the photoelectric cell 26 when the switch 60 is closed, thereby causing the establishment of a voltage level at the junction 54 which renders the transistor 58 conductive and effects the supply of energizing current to the indicator light 42 in order to test the operation of the indicator light 42 as well as to test for proper operation of the transistor 58.

Referring now to FIG. 5, still another alternative embodiment of an electrical circuit suitable for incorporation in the detector of the present invention is illustrated. This embodiment is essentially identical to the embodiment illustrated in FIG. 4 except that the switch 60 is replaced by another voltage divider arrangement 62, including a resistor 64 and also a resistor 66, which has a resistance which varies in response to temperature as a result of increased current flow therethrough. The voltage divider 62 is connected across the serially connected transistor 58 and indicator light 42 and includes a voltage divider junction 68 intermediate the resistors 64 and 66. The junction 68 is coupled to the base of the transistor 58 and the voltage level established at the junction 66 may be utilized to temporarily energize the transistor 58 upon the application of power across the power supply terminals 32, 34 so as to provide a brief indication of proper operation of the transistor 58 and the indicator light 42. In this regard, the resistor 66 preferably has a positive temperature coefficient of resistance such that increased temperature of the resistor in response to current flow therethrough effects self-heating of the resistor and causes its resistance to rise substantially. Furthermore, the voltage divider 62 is arranged such that the cold resistance of resistor 66 is substantially less than the resistance of resistor 64, while the resistance of resistor 66 in its heated condition is substantially higher than the resistance of resistor 64. Accordingly, upon initial energization of the system, current is permitted to flow through the resistor 64 and through the resistor 66 which is initially unheated and in a low resistance state, and the voltage level established at the junction 68 is sufficient to render the transistor 58 conductive, causing lighting of the indicator light 42. However, as current continues to flow through the resistor 66, its resistance abruptly increases and effects a sufficient variation in the voltage at the junction 68 to effect de-energization or nonconduction of transistor 58 which removes the energizing current from the indicator light 42. Subsequently, the resistor 68 remains in its heated condition, while power is being supplied to the circuit and hence no longer affects operation of the circuit while subsequent control of the conduction of transistor 58 is effected by the relative resistance of the photoelectric cell 26, which in turn depends upon whether or not it is exposed to reflected light in the manner previously explained. If desired, the resistor 64 may be replaced by a resistor having a negative temperature coefficient of resistance, while the resistor 66 is replaced by a conventional resistor in order to obtain analogous testing of the operation of the transistor 58 and the indicator light 42.

Referring now to FIG. 6, a further alternative embodiment of an electrical circuit adapted to be incorporated in a detector in accordance with the present invention is illustrated. In this embodiment, the light emitter 12 is once again optically coupled to the photoelectric cell 26 through the predetermined path 24, while the indicator light 42 is serially connected to the photoelectric cell 26. Accordingly, when the photoelectric cell 26 is in its high resistance mode in the absence of incident light thereon, the photoelectric cell prevents the application of energizing current to the indicator light, which consequently remains unlit. However, when the photoelectric cell 26 is exposed to light in the manner previously explained, it is in its low resistance mode and current is permitted to flow therethrough and hence to the indicator light 42 causing the indicator light to be lit as an indication of low fluid level. In addition, in order to provide automatic testing of the indicator light 42 upon initial energization of the circuit, a resistor 70 having a positive temperature coefficient of resistance is provided and connected in parallel relationship between the power supply terminal 32, the junction between the indicator light 42, and the photoelectric cell 26 such that the resistor 70 may temporarily shunt the photoelectric cell 26. In this regard, upon initial energization of the circuit when the resistor 70 is in an unheated condition and has a relatively low resistance value, current flows therethrough and hence to the indicator light 42 causing it to be momentarily lit as an indication of proper operation. However, as current continues to flow through the resistor 70, it begins to self-heat and its resistance increases to a level at which it no longer permits current flow therethrough and hence it no longer supplies energizing current to the indicator light 42 which becomes unlit until the photoelectric cell 26 is exposed to incident light to effect operation in its low resistance mode during which it permits energizing current flow therethrough and to the indicator light 42 as an indication of a fluctuation in the liquid level.

Accordingly, an improved detector has been shown and described in detail which is adapted for indicating the presence or absence of a predetermined medium at a predetermined level. In addition, various embodiments of electrical circuits have been described which are adapted for incorporation in such a detector in order to provide a composite unit which provides a visual indication of the presence or absence of the medium at the predetermined level.

Various changes and modifications in the above-described embodiments will be readily apparent to those skilled in the art and any of such changes or modifications are deemed to be within the spirit and scope of the present invention as set forth in the appended claims.

We claim:

1. A liquid level detector for sensing the presence of a liquid at a preselected level comprising an elongated generally cylindrical light transmitting medium having first and second ends, a light emitter mounted on said first end, a light refracting body having at least two non-parallel surface portions in the path of the emitted light at said second end, one of said surface portions defining an external interface oriented in a direction to contact the liquid being detected to effect transmission of the emitted light through said interface when said interface is in contact with said liquid and to reflect the emitted light from said interface along a predetermined path, only when said interface is not in contact with said liquid, said light transmitting medium effecting optical communication between said light emitter and said interface, said predetermined path extending through said light transmitting medium, a light responsive means mounted on said first end in optical communication with said predetermined path, said light responsive means comprises a photoelectric cell having a relatively high resistance in the absence of light incident thereon and a relatively low resistance in response to the presence of light incident thereon so as to provide an indication of the presence and absence of the liquid at the preselected level, indicating means electrically coupled to said photoelectric cell for providing an indication of relative liquid level in response to variations in the resistance of said photoelectric cell, said indicating means comprises an indicator light, said photoelectric cell electrically coupled to said indicator light for permitting energizing current to flow through said indicator light when said photoelectric cell is in its low resistance mode and for preventing energizing current from being supplied to said indicator light when said photoelectric cell is in its high resistance mode, and means are provided coupled to said indicator light and responsive to the energization of said light emitter for temporarily energizing said indicator light as an indication of operation thereof.

2. A liquid level detector in accordance with claim 1, wherein said means coupled to said indicator light comprises a resistor having a resistance which increases with increased temperature in response to current flow therethrough, said resistor being coupled between a source of electrical energization and said indicator light for temporarily supplying energizing current to said indicator light for a predetermined time interval upon energization of said light emitter to provide assurance of operation of said indicator light.

3. A liquid level detector in accordance with claim 1 wherein said light refracting body is defined by a conically shaped body having its vertex oriented in a direction facing the level of liquid to be detected.

4. A liquid level detector in accordance with claim 12 wherein said photoelectric cell is electrically connected in series relationship with said indicator light for effecting energization thereof in response to optical communication between said light emitter and said photoelectric cell and a resistor having a resistance which increases with increased temperature in response to current flow therethrough is connected in series relationship with said indicator light for temporarily supplying energizing current thereto upon energization of said light emitter to provide an indication of proper operation of said indicator light.

5. A liquid level detector for sensing the presence of a liquid at a preselected level comprising an elongated generally cylindrical light transmitting medium having first and second ends, a light emitter mounted on said first end, a light refracting body having at least two non-parallel surface portions in the path of the emitted light at said second end, one of said surface portions defining an external interface oriented in a direction to contact the liquid being detected to effect transmission of the emitted light through said interface when said interface is in contact with said liquid and to reflect the emitted light from said interface along a predetermined path, only when said interface is not in contact with said liquid, said light transmitting medium effecting optical communication between said light emitter and said interface, said predetermined path extending through said light transmitting medium, a light responsive means mounted on said first end in optical communication with said predetermined path, said light responsive means comprises a photoelectric cell having a relatively high resistance in the absence of light incident thereon and a relatively low resistance in response to the presence of light incident thereon so as to provide an indication of the presence and absence of the liquid at the preselected level, indicating means electrically coupled to said photoelectric cell for providing an indication of relative liquid level in response to variations in the resistance of said photoelectric cell, said indicating means comprises an indicator light, said photoelectric cell electrically coupled to said indicator light for permitting energizing current to flow through said indicator light when said photoelectric cell is in its low resistance mode and for preventing energizing current from being supplied to said indicator light when said photoelectric cell is in its high resistance mode, and a selectively energizable switch means having a control element is serially connected to said indicator light for supplying energizing current thereto in response to conduction of said switch means and said photoelectric cell is coupled to said control element for controlling the conduction of said switch means.

6. A liquid level detector in accordance with claim 5 wherein said switch means comprises a semiconductor switch means and a voltage divider is provided having a junction coupled to said control element, said voltage divider including a resistor coupled to said junction and said photoelectric cell coupled to said junction whereby the voltage at said junction is varied in response to variations in the resistance of said photoelectric cell so as to control the conduction of said semiconductor switch.

7. A liquid level detector in accordance with claim 6 wherein said resistor comprises another photoelectric cell optically coupled to said light emitter, said another photoelectric cell having a similar resistance value when exposed to light as the resistance value of said photoelectric cell whereby a variation in the resistance level at said voltage divider junction is effected in response to energization of said photoelectric cell and said another photoelectric cell.

* * * * *